United States Patent [19]

Asmundsson

[11] Patent Number: 4,832,305
[45] Date of Patent: May 23, 1989

[54] EQUIPMENT SUPPORT SYSTEM
[75] Inventor: Karl Asmundsson, Gilford, N.H.
[73] Assignee: Wyle Laboratories, El Segundo, Calif.
[21] Appl. No.: 852,189
[22] Filed: Apr. 15, 1986
[51] Int. Cl.[4] .............................................. F16F 7/14
[52] U.S. Cl. ................................... 248/636; 248/564; 248/60
[58] Field of Search ............... 248/636, 564, 567, 638, 248/60, 637; 52/167; 267/134

[56] References Cited

U.S. PATENT DOCUMENTS 3,771,499  11/1973  Marconi .
4,182,504  1/1980   Bernhard ............................ 248/636

FOREIGN PATENT DOCUMENTS 623630   4/1963  Belgium ............................. 248/567
0032392  1/1981  European Pat. Off. .............. 248/60
20243   12/1944  Finland .
187786  11/1966  U.S.S.R. ............................. 52/167
446588  10/1974  U.S.S.R. ............................. 52/167
547582   3/1977  U.S.S.R. .

OTHER PUBLICATIONS

"Byers 4-D Wrought Iron Tubular and Flat Rolled Products", *Engineering News Record*, Mar. 5, 1959, p. 37.

*Primary Examiner*—Ramon S. Britts
*Assistant Examiner*—Karen J. Chotkowski
*Attorney, Agent, or Firm*—Freilich, Hornbaker, Rosen & Fernandez

[57] ABSTRACT

A system includes a single snubber and a rigid strut, to support two spaced locations on equipment to a structural support, in a manner that allows each location of the equipment to slowly move independently of the other, as to accommodate changing equipment temperature, while resisting rapid movement of either, as can occur in an earthquake. A linking element is pivotally mounted on the support, and one end of the snubber and one end of the strut are pivotally mounted at spaced locations on the linking element. The opposite ends of the snubber and strut are pivotally mounted at spaced locations on the equipment.

3 Claims, 3 Drawing Sheets

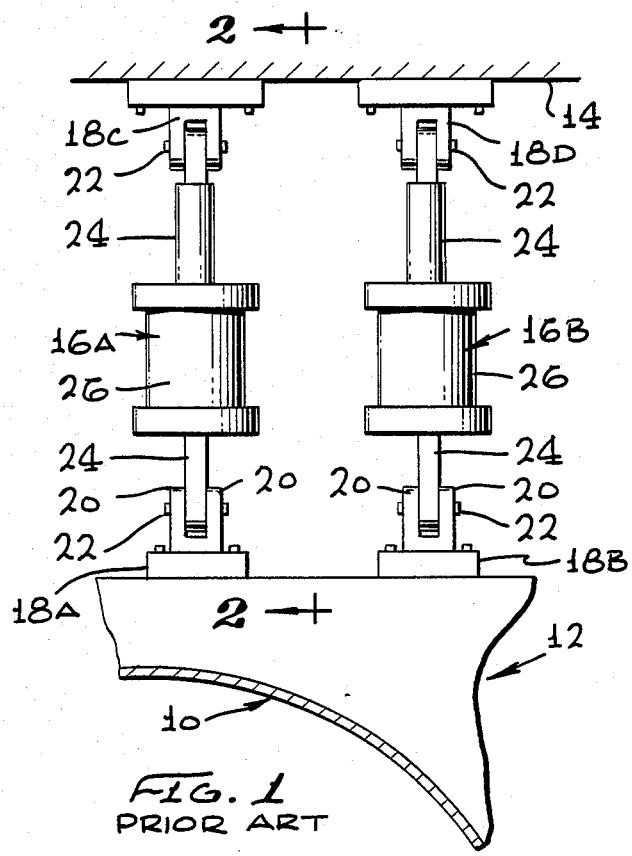
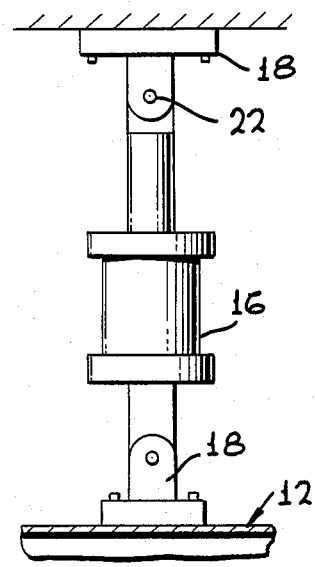
FIG. 1 PRIOR ART
FIG. 2 PRIOR ART
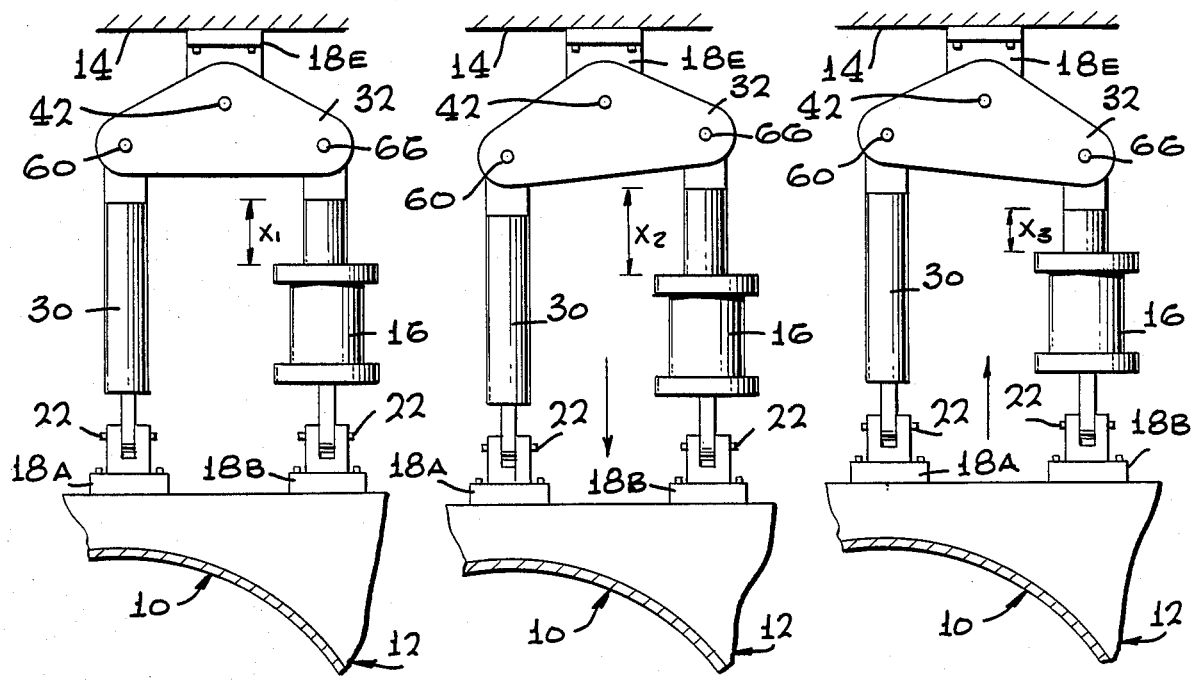
FIG. 3A  FIG. 3B  FIG. 3C

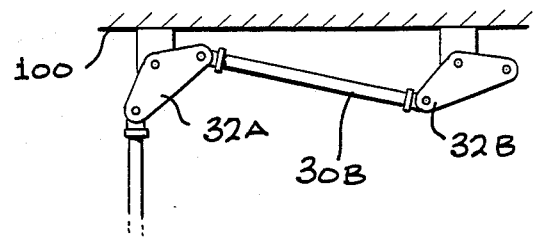
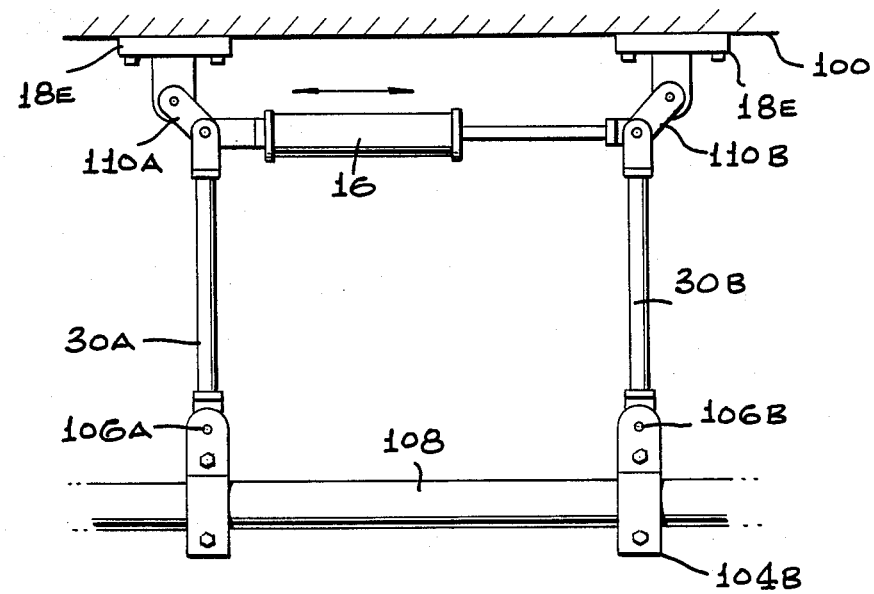
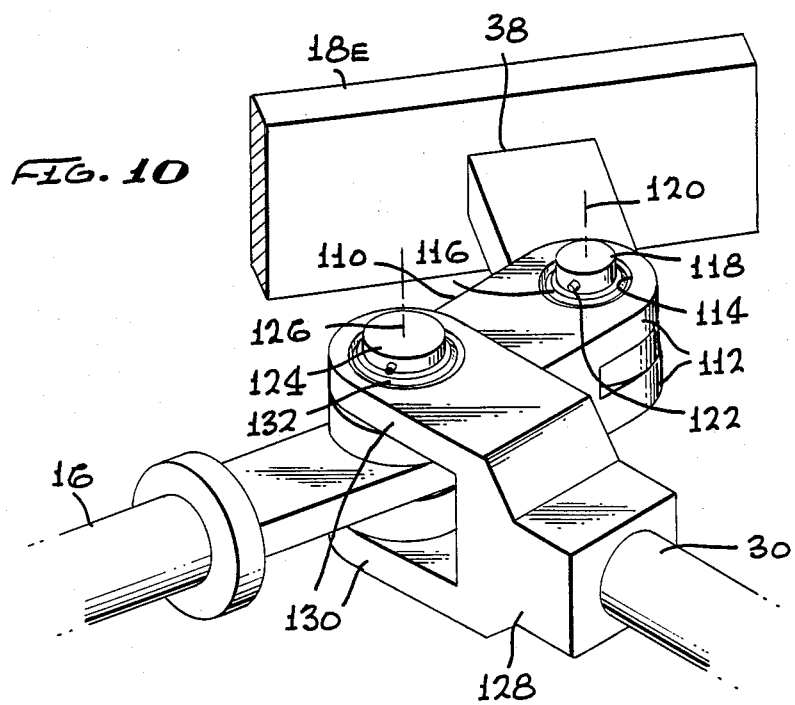

EQUIPMENT SUPPORT SYSTEM

BACKGROUND OF THE INVENTION

The present invention relates generally to an assembly for preventing rapid movement in response to acceleration forces such as earthquakes, between equipment (such as generators, pipes, etc.) and a supporting structure from which the equipment is at least partially supported, while permitting slow movement between such equipment and the structure in response to changes in the temperatures to which the equipment is subjected. More particularly, the present invention relates to an improved snubber assembly for at least partially restraining such equipment and to a method of reducing the number of snubbers utilized in such supporting structures.

In facilities, such as nuclear power generating plants, various pieces of equipment (including, for example, generators, pipes as well as other material handling devices) are utilized for carrying and using high pressure and/or high temperature fluids such as steam, water, sodium and other materials. These pieces of equipment are typically supported (at least in part), spaced from, the walls, floors or ceilings of a building or other surrounding rigid support structures. In geographical areas where frequent earthquakes occur, there is serious concern that such equipment may be damaged during an earthquake because of rapid relative movement due to relatively large acceleration forces between the equipment and the walls, floors or ceilings from which the equipment is supported. This same concern also exists for other "dynamic events" in the equipment which can result in unwanted vibrations or surges, such as water or steam hammer that may occur when there is a sudden opening or closing of valves. Accordingly, there is a current requirement that dynamic restraint devices, i.e., snubbers, be attached between the equipment and the adjacent support structure to prevent or dampen such rapid relative movement during an earthquake or other dynamic event. The equipment must be restrained in such a manner so as to allow the equipment to expand and contract a considerable amount in response to changes in operating temperatures, particularly during start up and shutdown of the facility. The snubbers therefore must permit slow relative movement due to changes in operating temperatures. Each snubber must also be capable of recovering automatically after a dynamic event to once more permit slow movement of the equipment relative to its surrounding support structure.

Each snubber must, of course, be highly reliable, especially because of the expense of providing access, to repair or replace a malfunctioning snubber. Further, since many snubbers are located in high radiation areas during plant operation, the frequent maintenance of such snubbers presents a health hazard to those workers servicing the snubbers. Under guidelines of existing rules and standards, it is still necessary to remove, inspect, test, and reinstall each snubber every five to ten years. The necessary steps to achieve such maintenance are extremely expensive, currently running at about $20,000 per snubber per plant life. Further, since a plant's life is estimated to be about 40 years, such snubbers must each be removed, inspected, tested, and reinstalled severals times over the life of the plant. Since recently built plants contain as many as 2,000 snubbers, or more, it is not difficult to appreciate the relatively large expense necessary to maintain these snubbers.

SUMMARY OF THE INVENTION

Accordingly, it is an object of the present invention to reduce the total costs associated with maintaining snubber without compromising safety.

Another object of the present invention is to reduce the number of snubbers ordinarily employed in a plant, without reducing the effectiveness of those snubbers.

These and other objects are achieved by an improved dynamic restraint system for restraining equipment relative to a structural support, such as a wall of a facility, so that said equipment is slowly movable with respect to the structural support such as in response to changes in operating temperatures within the facility, while remaining substantially rigid with respect to the structural support in response to relatively large acceleration forces. The system comprises a snubber and at least one strut, and means for supporting two spaced locations on the equipment onto the structural support, with some of the support applied through said strut.

In one system, one end of a strut and one end of a snubber are pivotally mounted on spaced locations on the equipment. The opposite ends of the strut and snubber are mounted on opposite ends of a linking device formed by a linking element. The middle of the linking element is mounted on the structural support. Thus, a single snubber is used to support two spaced locations of the equipment.

In another system the linking device includes two linking elements that are mounted at spaced locations on the structural support, the two elements being connected by another strut. In other system two struts have first ends pivotally mounted on the equipment and second ends connected to opposite ends of a snubber; the snubber ends are also coupled through pivoting arms to the support structure.

The present invention also relates to the technique of modifying a prior system for supporting equipment from a structural support wherein the prior system includes at least two snubbers pivotally mounted at spaced apart positions, on the equipment and on the support. The method comprises the steps of disconnecting at least one of the snubbers and replacing the disconnected snubber with a linking element and a rigid elongated strut. One end of the strut is pivotably connected to the equipment and the other end of the strut is pivotally connected to the linking element about a first axis. The linking element is pivotably connected to the structural support about a second axis spaced from and parallel to the first axis. The remaining snubber has one end pivotally connected to the linking element about a third axis, and another end left on the equipment.

For a fuller understanding of the nature and objects of the present invention, reference should be made to the following detailed description taken in connection with the accompanying drawings.

BRIEF DESCRIPTION OF THE DRAWINGS

FIG. 1 is a top view of one-half of a typical prior art snubber assembly for restraining a steam generator in a nuclear power plant;

FIG. 2 is a view taken along line 2—2 of FIG. 2;

FIGS. 3A, 3B, and 3C are top views of the snubber assembly of FIG. 1 modified in accordance with the present invention showing the assembly in three different positions so as to illustrate slow movement of the assembly in response to changes in operating temperature;

FIG. 8 is a perspective view of the snubber assembly of FIG. 7 modified in accordance with the present invention, while FIG. 8B is an elevation view of a portion of FIG. 8;

FIG. 9 is an elevational view of another embodiment of a snubber assembly incorporating the present invention;

FIG. 10 is a detailed perspective view, partially cut away, of the linking element of the FIG. 9 assembly.

DESCRIPTION OF THE PREFERRED EMBODIMENT

Figure 4:
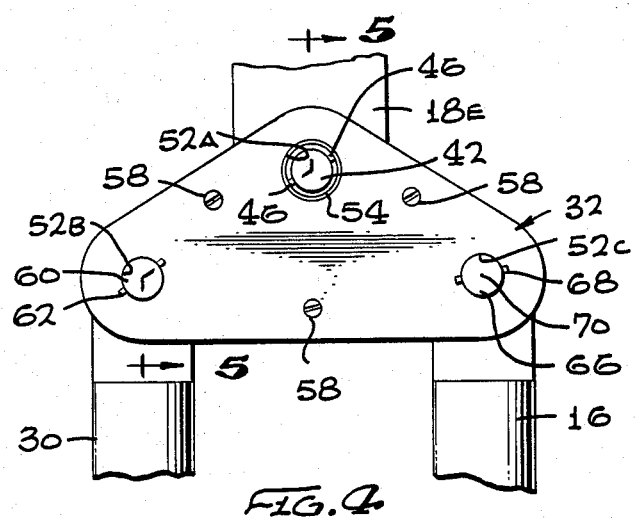
FIG. 4 shows a front view of the linking element of the embodiment of the present invention shown in FIGS. 3A, 3B, and 3C.

FIGS. 1 and 2 show a portion of a typical prior art assembly for supporting material handling equipment 10, such as a steam generator or other material handling device which is held by a girder 12. The girder 12 of the equipment often forms a rectangular enclosure having four sides surrounding the steam generator or other device. At least one side of the girder 12 (and often two sides) is positioned near a wall 14 or other rigid structural support of the plant. Snubbers 16A, 16B couple two spaced locations of each side of the girder, and therefore the equipment 10 to the wall 14.

A pair of spaced mounts 18A and 18B are secured at each end of the side of the girder 12 which faces the support 14. Each mount 18A and 18B includes a U-shaped yoke arrangement including a pair of spaced arms 20 for receiving one end of the corresponding snubber 16A and 16B. The arms 20 of each mount each have an aperture (not shown) for receiving a pivot pin 22. The pins 22 at the mounts 18A and 18B are axially aligned. A pair of mounts 18C and 18D are secured to the support 14 for supporting the opposite ends of the respective snubbers 16A and 16B. Mounts 18C and 18D are similar to mounts 18A and 18B. The mounts are positioned so that snubbers 16A and 16B have their axes of elongation parallel to one another and to the direction of movement of the equipment 10 relative to support 14, when the equipment 10 expands or contracts responsively to changing operating temperatures.

As is well known in the art, each snubber 16 includes a pair of aligned opposite arms 24 secured within a housing 26. The arms will slowly move relative to one another along the axes of elongation, as in response to changes in operating temperatures, while resisting rapid movement and thereby remaining rigid in repsonse to acceleration forces such as those commonly experienced during earthquakes and other dynamic events.

While the assembly shown in FIGS. 1 and 2 is usually satisfactory in protecting equipment during dynamic events, it is excessively costly to maintain. In accordance with the present invention, the assembly is modified to reduce the number of snubbers so that only one snubber is necessary to support two spaced locations of the equipment 10 with respect to the support 14.

More particularly, one or more rigid elongated strut members are substituted for one of the snubbers 16, and a linking device connects the remaining snubber to at least one of the strut members. One embodiment shown in FIGS. 3A, 3B, and 3C utilizes one rigid strut or strut member 30 and a linking device 32 formed by one three-point pivot linking element.

The rigid strut member 30 is elongated in one direction and is made of a suitable material such as a good grade steel to accommodate loads of tension or compression applied in the direction of its elongated axis. Each end of the strut member 30 includes a suitably sized aperture (one being shown at 34 in FIG. 5) fitted iwth a sperical bearing 36. One end of the strut member 30 is pivotably connected to the support mount 18A (FIG. 3A) by a pin 22, while the other end is pivotably connected to the linking device or element 32.

Figure 5:
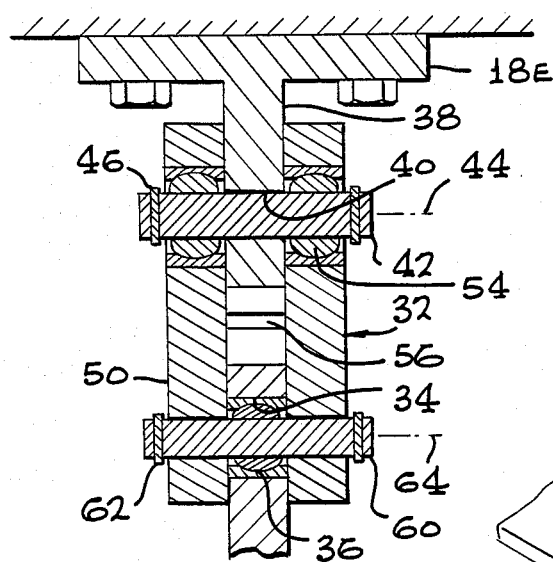
FIG. 5 is a cross-sectional view taken along line 5—5 of FIG. 4.

The linking element 32 supports at spaced-apart locations, one end of strut member 30 and one end of the remaining snubber 16. Strut member 30 and snubber 16 are mounted so that their elongated central axes lie in the same plane. Although the strut member and snubber are shown with their elongated central axes disposed parallel to one another, the axes may be oriented to intersect with one another at any angle practicable. A single mount 18E on the wall or other support 14, pivotally supports linking element 32 by a pin 42. As shown in FIG. 5 support 18E preferably includes a single arm 38 having an aperture 40 for receiving the pivot pin 42 that pivotably supports the linking element 32 about the pivot axis 44. Any suitable means such as retaining pin 46 secures the pivot pin 42 in place. Support 18E functions as a fulcrum about which the element 32 can pivot in response to movement of snubber 16 and rigid strut 30.

Figure 6:
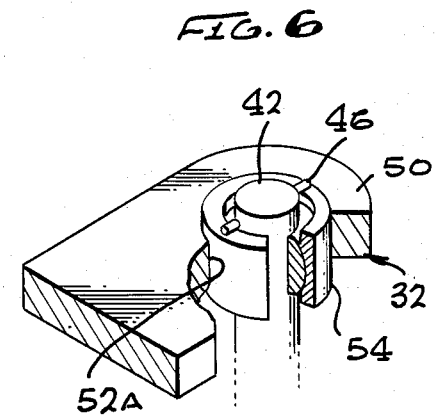
FIG. 6 is a fragmentary perspective view of a detailed portion of the linking element shown in FIGS. 4 and 5.

The preferred linking element 32, shown in greater detail in FIGS. 4–6, comprises a pair of plates 50 with apertures 52A, 52B, and 52C. Apertures 52A, 52B, and 52C preferably are disposed in a triangular relationship with apertures 52B and 52C being at a distance from 52A in accordance with the following relationship:

$$r_1/r_2 = S \cdot \sin(\beta + \phi) / P \cdot \sin(\alpha + \theta)$$

wherein
$r_1$ is the distance between the centers of apertures 52A and 52C;
$r_2$ is the distance between the centers of aperatures 52A and 52B;
S is the force applied by the strut member 30;
P is the force applied by the snubber 16;
$\beta$ is the angle formed between a line drawn between the centers of apertures 52A and 52B and the vertical;
$\alpha$ is the angle formed between a line drawn between the centers of apertures 52A nd 52C and the horizontal;
$\theta$ is the angle formed between the direction of force P and the horizontal; and
$\phi$ is the angle formed between the direction of force S and the vertical.

The distances $r_1$ and $r_2$ may vary so as to gain the best mechanical advantage. In cases where the forces P and S are equal in magnitude, $r_1$ will equal $r_2$. While the triangular relative position of apertures 52A, 52B, and 52C shown in FIGS. 3 and 4 are preferred, it should be appreciated that the apertures can be aligned with one another in a single row, i.e., $\alpha = 0°$ and $\beta = 90°$, or vary their relative angles, or be arranged in any relative order (i.e., wherein either aperture 52B or 52C is positioned between the remaining two apertures) whichever may be the most advantageous in order to gain mechanical advantage.

Aperture 52A receives a spherical bearing 54. Plates 50 are secured together in a spaced-apart, parallel relationship by the spacers 56 secured together by any suitable means such as screws 58, or by plates bolted to each end of the spaced-apart plates (not shown) or by any other equivalent means, depending on space and strength requirements, so that the respective apertures 52A, 52B, and 52C of the plates are aligned. The portion of the linking element including the apertures 52A of both plates receives the arm 38 of the support 18E between the plates 50 and is held in place by the pivot pin 42, as shown in FIG. 5. The portion of the linking element 32 including apertures 52B of both plates 50 receives therebetween the end of strut member 30. The latter is held in place by pivot pin 60 supported in the spherical bearing 36 of the strut member 30 apertures 52B of both plates 50 by any suitable means such as retaining pin 62 so that the member 30 and element 32 are pivotable with respect to one another about the axis 64. Axis 64 is parallel to axis 44 of the pivot pin 42. Similarly, the portion of the linking element 32 including apertures 52C of both plates 50 receives therebetween the end of the arm of the snubber being held in place by pivot pin 66. Pin 66 extends through spherical bearings (not shown) provided at the end of the arm of snubber 16, and through apertures 52C of the plates 50 and is held in place by any suitable means such as retaining pin 68. The snubber 16 and the linking element are thus pivotable with respect to the pivot axis 70 of the pivot pin 66. Axis 70 is parallel to both the axes 44 and 64.

As best shown in FIGS. 3A, 3B, and 3C, when the system is exposed to changes in temperatures, such as the changes in temperature occurring in start ups and shut downs of a power plant, the snubber 16 operates in a manner well-known in the art, wherein the opposite arms of the snubber move in their elongated direction relative to one another. As the temperatures changes, the equipment 10 moves by thermal expansion or contraction. This results in a force being applied to the strut member 30 and to the snubber 16. The force applied to the strut member 30 will be transmitted through the linking element 32 by virtue of the fact that the pivot pin 42 functions as a fulcrum. The force applied to the snubber, directly at one end by the snubber and at the other end by the linking element, is over a relatively long period of time and this force will be accommodated by the snubber by relative movement of the two arms of the snubber either toward or away from one another depending upon whether the equipment is expanding toward the wall or contracting away from the wall 14, thus lengthening by an amount equal to $X_2 - X_1$.

As shown in FIG. 3B, when the equipment is contracting due to a decrease in operating temperatures, as will occur during shutdown of a plant, the arms of the snubber will be pulled away from one another as the girder 12 moves away from the wall 14. As shown in FIG. 3C, when the equipment is expanding due to an increase in operating temperature, as will occur during start-up of a plant, the arms of the snubber 16 will be pushed toward one another as the girder 12 moves toward the wall 14, thus shortening by an amount equal to $X_1 - X_3$. It should be appreciated that relative movement of the arms of the snubber will cause the linkage element 32 to pivot. The strut member 30 will however accommodate the pivoting movement of the linking element 32 about the pin 42 by pivoting to a slight extent about the pivot pin 60. However, should the system be subjected to rapidly accelerating forces, such as those normally associated with earthquakes, or other dynamic events, the snubber 16 will lock up so that the arms of the snubber cannot move relative to one another and the snubber thus becomes rigid and the equipment will move with the wall. After the dynamic event the snubber will operate in the manner previously described.

The system of FIGS. 3A–3C allows a single snubber 16 to be used to support, on the support 14, two spaced locations (at 18A and 18B) on the equipment, in a manner that allows each location to move only slowly towards and away from the support 14. In FIGS. 3A–3C the distance between the locations of the mounts 18A, 18B is about 40% of the distance between the equipment 10 and the support 14. The spacing of the mount locations is preferably more than 10% of the distance between the equipment and the support or between the ends of the rigid strut member 30, to provide considerably spaced mount locations that help resist angling or pivoting of the equipment as well as its movement toward and away from the support. If the equipment tends to tilt from its initial orientation to a tilted orientation during a temperature change, as where mount 18B (FIG. 3A) moves upward while mount 18A moves downward, the system accomodates such tilting and then resists any sudden tilting away from the tilted orientation. The fact that the equipment is held at two spaced locations at 18A and 18B, allows such resistance to tilt.

Figure 7:
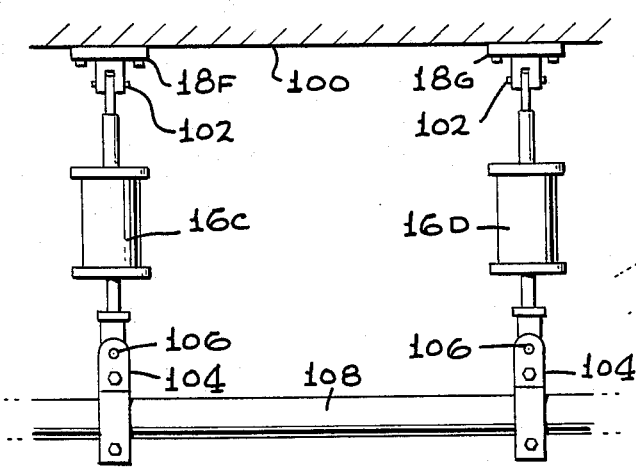
FIG. 7 is an elevational view of another typical prior art snubber assembly for restraining piping.

The principles of the present invention can also be used to support equipment such as piping even when a pair of snubbers are disposed at a large distance from one another. As shown in FIG. 7, the mounts 18F and 18G of the prior art system are secured to the ceiling 100 of a plant in a spaced-apart relation. An arm of each of the snubbers 16C and 16D is respectively secured to the respective one of the mounts 18F and 18G. A pivot pin 102 is used to pivotally secure the respective arm to the corresponding support, with pivot pins 102 being aligned with one another. The end of the opposite arm of each snubber 16C and 16D is secured by pivot pin 106 to a clamp mount 104 for restraining the piping 108. The pivot pins 106 are typically parallel to one another. The snubbers 16C and 16D are secured so that their elongated axes remain substantially parallel to one another normal to the elongated direction of piping 108, with the elongated axes of snubbers 16C and 16D and piping 108 all lying substantially in the same plane.

Figure 8:
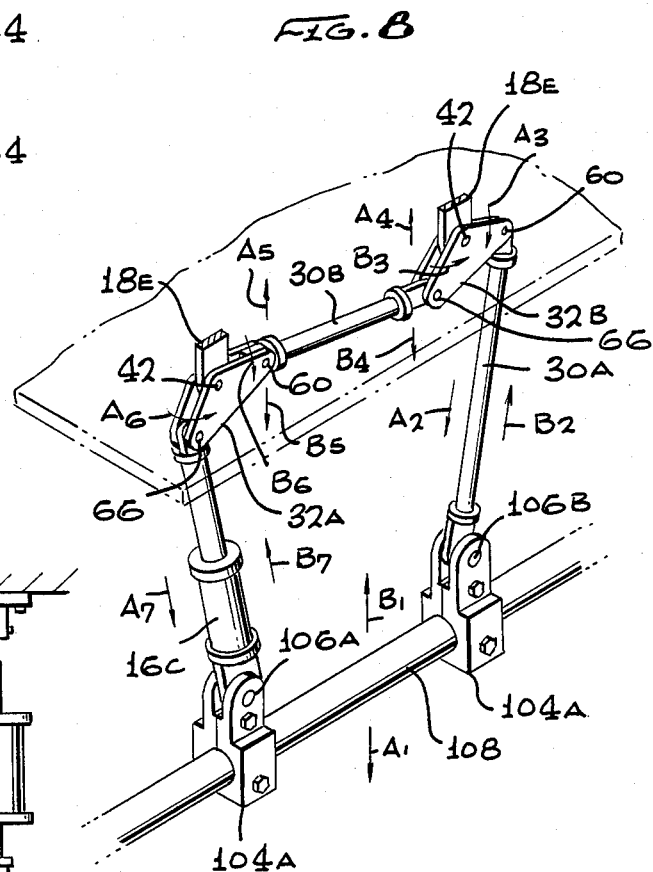

The original mounts 18F and 18G can be kept, or can be replaced by new ceiling mounts each identical to mount 18E shown in FIGS. 4 and 5. Each new mount 18E supports the center pivot pin 42 of a respective linking device or element 32A and 32B (FIG. 8). One of the snubbers (snubber 16D or FIG. 7) is replaced by an elongated element which is a strut member 30A (FIG. 8) having one end secured to the pivot pin 106B of the clamp mount or clamp 104B and its other end secured to the pivot pin 60 of linking element 32B. The remaining elongated element which is a snubber 16C has one arm still connected to the pivot pin 106A of the clamp 104A, while its other arm is connected to pivot pin 66 of linking element 32A. A rigid elongated element which is a strut member 30B is connected at opposite ends to the respective pivot pins 60 and 66 of linking elements 32A and 32B. In this embodiment, all of the pivot pins are disposed parallel to one another. The elongated axes of snubber 16C and strut member 30A may be parallel to one another or non-parallel as shown in FIG. 8 and may be perpendicular to piping 108 and/or strut member 30A or non-perpendicular. The only requirement is that the elongated axes of snubber 16C and strut member 30A and strut member 30B are all in the same plane, preferably, although not necessarily, in the same plane as the elongated axis of the piping 108.

As shown in FIG. 8, when the system is subjected to changing operating temperatures, the piping moves relative to the ceiling 100 as indicated by arrow $A_1$ or $B_1$ depending upon which way the piping will move in response to increasing and decreasing temperatures. Specifically, as the piping moves relative to the ceiling 100 in response to changing temperatures, a force will be applied to both the snubber 16C and the strut member 30A. The force being applied at a very slow rate will be applied directly to one end of the snubber by the clamp 104A through the pin 106A and directly to one end of the strut member 30A by clamp 104B through the pin 106B. The force applied to the strut member 30A will be transmitted through the linkage element 32B, strut member 30B and linkage element 32A to the other end of the snubber 16C. Since the forces applied are of the type which occur very slowly due to changes in the operating temperatures, the arms of the snubber 16C will be pulled apart when the piping 108 moves away from the ceiling 100, and will be pushed toward one another when the piping 108 moves toward the ceiling 100. More specifically, when the piping 108 moves away from the ceiling 100 in the direction of arrow $A_1$, this results in down force being applied to the strut member 30A in the direction of arrow $A_2$. As the strut member moves downwardly the linking element 32B pivots about the pivot pin 42 in the direction of arrow $A_3$. As the linking element pivots it pushes the strut member 30B causing the latter to move and to rotate at opposite ends about the respective pin 66 of linking element 32B and pin 60 of linking element 32A as shown by arrows $A_4$ and $A_5$. The movement of strut member 30B about pin 60 of linking element 32A causes the linking element 32A to rotate about pin 42 in the direction of arrow $A_6$. This movement, as well as the movement of the piping 108, is accommodated by the snubber 16C as shown by the arrow $A_7$ since the opposite ends of the snubber are movable with respect to one another. Movement of the piping 108 toward the ceiling 100 in response to changes in temperature results in identical but opposite movements as indicated by the arrows $B_1$–$B_7$.

It should be appreciated that various modifications can be made without departing from the present invention. For example, the snubber of the system of the present invention need not be connected directly to the equipment, but can be located at any position in the linkage system, so long as the linkage system remains in the same plane. Thus, as shown in FIG. 9, the snubber 16 of FIG. 8 system can be connected between the two ceiling supports and the same advantages will be achieved. Further, the linking element need not be a three-point pivot element as described and shown in FIGS. 3A, 3B, 3C, 4–6, and 8. For example, as shown in FIGS. 9 and 10, a two-point pivot linking element 110A and 110B can be utilized. The linking element shown in detail in FIG. 10 is similar to the linking element 32 in that it includes a pair of plates 112 secured together in a parallel spaced-apart relationship, each of the plates, however, are provided with only two apertures 114 (one being shown in FIG. 10) with one of the apertures receiving a spherical bearing 116. A pivot pin 118 extends through one set of apertures 114 of the ears 112, is set in the respective spherical bearings 116 secured in each aperture, and pivotably couples the linkage element 110 to the arm 38 of the ceiling mount 18E so that the linkage element pivots with repsect to the support 18E about the axis 120. A retaining pin 122 secures the pivot pin 118 in place. A second pivot pin 124 extends through the other set of apertures of the ears 112 of the linkage element 110 and is set in respective apertures for pivotably securing the two elements of the linkage system so that the two elements can pivot with respect to one another about the axis 126. In the embodiment shown in FIG. 9, one end of the snubber 16 and one end of the strut member 30 are secured to the pivot pin 124 of each linkage element 110 so that they will pivot about spherical bearings independently of one another. In order to connect both the snubber 16 and strut member 30 to pin 124, one of the elements of the linkage system, e.g., the strut member, includes a yoke 128 having spaced-apart arms 130. The arms each include an aperture for receiving a spherical bearing 132, which in turn receives the pivot pin 124. Pivot pin 124 is held in place by any suitable means such as the retaining pin 134.

The foregoing system is useful in the design of new snubber systems for use in power plants. The system is also useful for existing systems, wherein in accordance with one aspect of the present invention at least one strut member and at least one linking element can be used to replace an existing snubber. By replacing existing snubbers in a plant, the resulting additional snubbers can be placed in stock for future use. This is of particular value should the particular snubber no longer by made by the manufacturer. The removal of the snubber reduces the total number of necessary snubbers. Thus, there is a a reduction in the inspection, testing, maintenance, and servicing of the total number of snubbers by removing a percentage of them.

The system and method of the present invention have other advantages. By utilizing the present invention in new or existing designs, there is often a reduction in the amount of dead band (i.e., slack resulting from mechanical connections and devices or hydraulic valve closure). The use of a strut member and linkage element in place of the additional snubber, results in a total play less than the play normally seen in the snubber which is replaced, as the remaining snubber may move twice as far as in the prior art. The systems of FIGS. 3A, 3B, 3C, 4–6, 8, and 9 can provide an additional factor of safety than otherwise provided by the prior art systems of FIGS. 1, 2, and 7. For example, if one snubber fails, i.e., fails to become rigid when subjected to relatively rapid accelerating forces, it is probable that the other snubber of the set shown in FIGS. 1, 2, and 7 will also fail since it will be overloaded. Thus, the equipment such as the steam generator or piping will not be restrained in the direction intended. During a dynamic event, the equipment would be allowed to move within a full stroke of the snubber. The system of the present invention can limit this stroke distance through the constraints allowed by the strut and the maximum pivoting movement limited by the linkage elements striking the wall or ceiling of the plant. Further, the strut member can be designed to carry much greater forces than a snubber, so that the strut member could take much larger loading should the snubber fail. By reducing the number of snubbers, one also reduces the probability of failure. This system can have the added advantage in that the piping system would carry less weight since strut members can be designed to weigh considerably less than snubbers. Further, snubbers can be removed from high radiation sources and areas, as well as relocated in more accessible areas.

Since certain changes may be made in the above process and apparatus without departing from the scope of the invention herein involved, it is intended that all matter contained in the above description or shown in the accompanying drawings shall be interpreted in an illustrative and not in a limiting sense.

What is claimed is:

1. A dynamic restraint system for restraining a pipe or other equipment relative to a structural support to allow the equipment to move slowly, as in response to temperature changes, but to resist rapid movement of the equipment, as in response to a large earthquake or other source of large acceleration forces, comprising:
   a first pair of mounts attached to the support structure at a pair of spaced locations;
   a second pair of mounts attached to the equipment at a pair of spaced locations;
   first and second linking devices, each pivotally connected to one of said first mounts respectively about first and second axes;
   three elongated elements, two of them being rigid struts with opposite ends and the other being a snubber which has opposite ends which can move slowly apart and together but which are resistant to rapid relative movement;
   a first of said elongated elements having one end pivotally connected on one of said second mounts and an opposite end pivotally connected to the first linking device about an axis spaced from the first axis;
   a second of said elongated elements having an end pivotally connected on the other of said second mounts and an opposite end pivotally connected to the second linking device about an axis spaced from the second axis;
   the third of said elongated elements having one end pivotally connected to said first linking device at a location spaced from the first axis and its opposite end connected to the second linking device at a location spaced from the second axis.

2. The system described in claim 1 wherein:
   said snubber forms the first of said elongated elements, and the snubber end that is pivotally connected to the first linking device is pivotally connected thereto about an axis that is spaced from said one end of said third elongated elements;
   one of said rigid struts forms the second of said elongated elements, and the end of said second element that is pivotally connected to the second linking device is pivotally connected thereto about an axis that is spaced from said opposite end of said third elongated element.

3. The system described in claim 1 wherein:
   said snubber forms the third of said elongated elements.

* * * * *